March 24, 1964    M. D. VAN PEURSEM ETAL    3,125,990
STOCK FEEDER
Filed Oct. 9, 1962
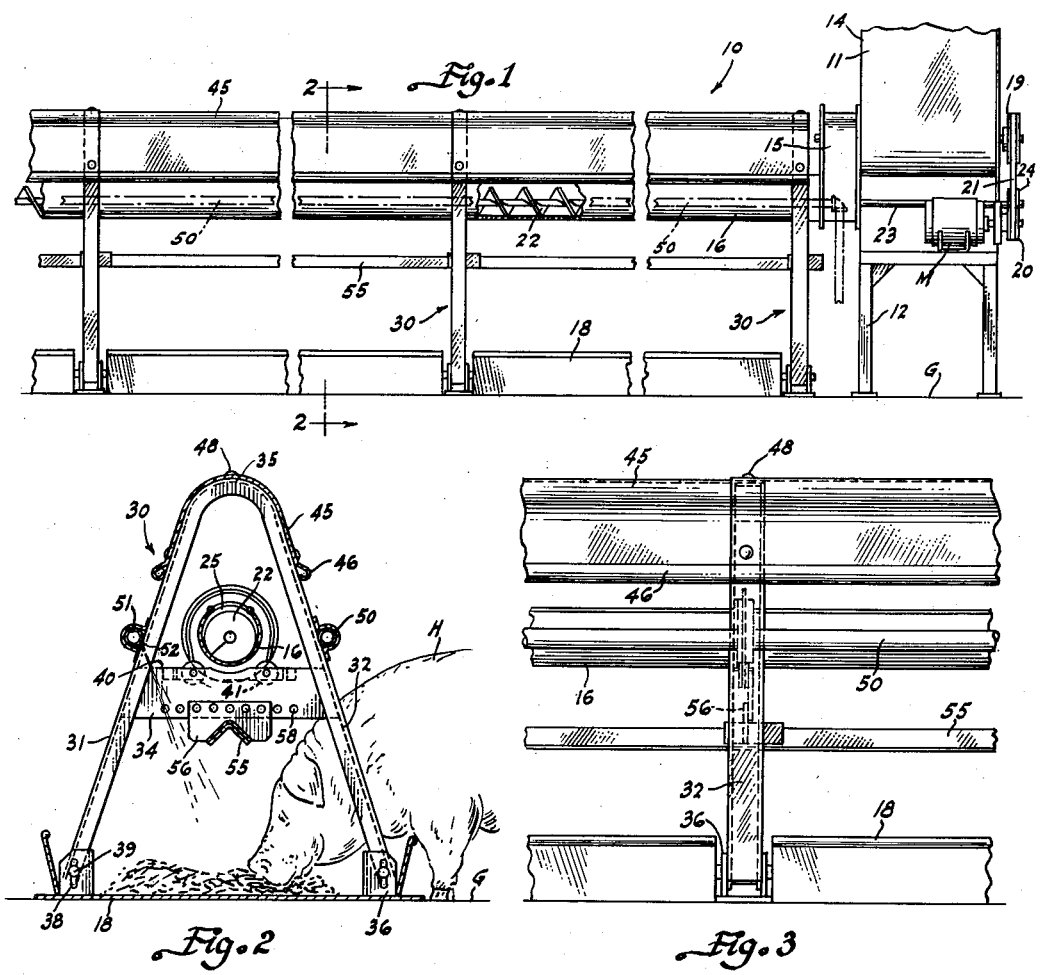
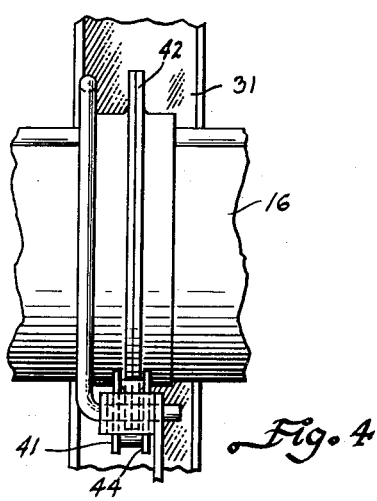
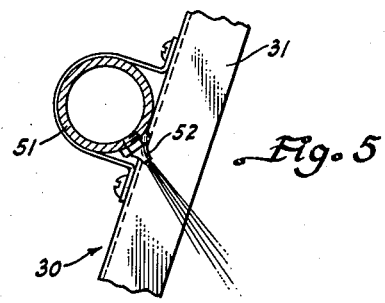
INVENTORS
MARVIN D. VAN PEURSEM
& ALBERT M. BEST
By Joseph A. Brown
ATTORNEY

United States Patent Office 3,125,990
Patented Mar. 24, 1964

3,125,990
STOCK FEEDER
Marvin D. Van Peursem and Albert M. Best, New Holland, Pa., assignors to Sperry Rand Corporation, New Holland, Pa., a corporation of Delaware
Filed Oct. 9, 1962, Ser. No. 229,380
3 Claims. (Cl. 119—52)

The present invention relates generally to devices for feeding stock animals. More particularly, the invention relates to an improved structure for operatively supporting a stock feeder of the type having a fill-and-dump rotatable container as shown in U.S. Patent No. 2,940,639.

The feeder shown in such patent comprises a container tube which extends horizontally relative to a trough beneath it. The container has a longitudinal slot which is adapted to be located in an upper or twelve o'clock position while the container is filled with feed by an auger operative therein. When the feed has been conveyed and distributed throughout the length of the container, the container is rotated to move the discharge slot to a six o'clock position and thereby dump the contents. The container tube then returns to its original position to be again filled with feed. The fill-and-dump procedure is repeated a desired number of times until an adequate supply of feed has been dispensed for a given feeding operation.

A main object of this invention is to provide a simplified structure for rotatably supporting a container tube in a stock feeder of the character described, various components of the support structure serving a plurality of functions.

Another object of this invention is to provide a support structure of the character described wherein a cover is provided for and spaced vertically from a container of the feeder, such cover forming part of the support.

Another object of this invention is to provide feeder support structure of the character described having feed divider means which is adjustable relative to the feeder to thereby selectively establish the division and distribution of deposited feed.

Another object of this invention is to provide a vertically adjustable support for a stock feeder whereby various sizes of animals may be accommodated.

A further object of this invention is to provide a stock feeder support structure incorporating means for providing water for the stock animals.

A still further object of this invention is to provide a stock feeder support structure which is of simple design and inexpensive to manufacture and assemble.

Other objects of this invention will be apparent hereinafter from the specification and from the recital in the appended claims.

In the drawing:

FIG. 1 is a part side elevation, part fragmentary section of a stock feeder constructed according to this invention;

FIG. 2 is an enlarged vertical section taken on the line 2—2 of FIG. 1 looking in the direction of the arrows and showing one of the A-frame supports employed along with a hog feeding from the trough beneath the feed structure;

FIG. 3 is a partial side elevation of FIG. 2;

FIG. 4 is an enlarged side elevation showing the connection of two tube sections of the feed container; and FIG. 5 is an enlarged section showing a means for watering the stock.

Referring now to the drawing by numerals of reference, 10 denotes generally a stock feeder having a supply hopper 11 carried on a frame 12 supported on the ground G. Hopper 11 is provided with a discharge opening, not shown, in side wall 14 which communicates with a chute 15. At its lower end, chute 15 communicates with a U-shaped, elongated, horizontally extending container 16 located above and in register with a feeding station or trough 18 on the ground G.

For discharging material from hopper 11, unloading means, not shown, such as an auger is provided and driven by a motor M through sheaves 19 and 20 and belt 21. The material is deposited in chute 15 whereupon it falls downwardly to container 16. From there, the material is conveyed and distributed throughout the length of container 16 by an auger 22. Auger 22 has a shaft 23 connected by sheave 24 and belt 21 to the motor M whereby when the motor is operated to discharge material from hopper 11, it also operates to drive the conveying and distributing auger 22.

As shown best in FIG. 2, container 16 has a longitudinal slot 25 which extends for the full length of the container. Slot 25 is adapted to be located in a twelve o'clock position as shown in FIG. 2 while feed is being conveyed and distributed by the auger 22. Thereafter, container 16 is adapted to be rotated to move the slot 25 to a six o'clock position and thereby dump the contents of the container. Subsequently, the container is returned to its original position for an additional filling operation. The container 19 is adapted to be filled and dumped in successive operations to provide feed for the feeding station or trough 18. The drive means for rotating container 16 is located within chute 15 and is not described in detail here since it is not part of the present invention. In general however, the operation of the device is similar to that shown in Winter Patent No. 2,940,639.

This invention resides in the structure for rotatably supporting the container 16. Such structure comprises a plurality of A-frames 30 which extend in transverse vertical planes relative to the container 16, there being a support frame at spaced locations such as every ten feet along the container. Each A-frame structure comprises a pair of legs, namely leg 31 and leg 32 widely spaced at their lower ends and converging as they extend upwardly. Intermediate their ends, the legs are interconnected by a crossbar 34 and at their upper ends the legs are interconnected by a top section 35. Preferably, the legs 31 and 32 and the top section 35 are integral and formed from the same, continuous member.

The lower ends of the legs 31 and 32 are connected to upstanding brackets 36 rigid with trough 18. The brackets 36 have vertical slots 38 which receive connecting bolts 39. It will be apparent that by loosening the bolts 39, the legs 31 and 32 can be adjusted vertically relative to the trough to establish a desired vertical space between crossbar 34 and trough 18.

The upper edge 40 of the crossbar rotatably supports a pair of laterally spaced rollers 41 rotatable about axes parallel to the extension of container 16. At spaced points along the length of container 16, radially extending flanges 42 are provided which serve to interconnect one container section to the next section and these flanges fit into the grooved peripheries 44 of the rollers 41 to be rotatably supported thereby. When a rotatable force is applied to the container 16, the container rotates relative to each A-frame 30 and on the rolling support provided by rollers 41.

As shown in FIG. 2, container 16 is carried between legs 31 and 32 and above crossbar 34. To prevent rain and the like from entering the container through longitudinal slot 25, a cover 45 is provided which is formed of sheet metal and curved to conform to top section 35. The cover extends downwardly along the outside of each leg support and it is provided with curved beads 46 to strengthen the structure. Cover 45 is bolted to the respective A-frames by fasteners 48 which project downwardly through the cover and connect to the top sections 35. The width of cover 45 is greater than the diameter of container 16 whereby the container is completely protected from above and to a substantial distance on opposite sides thereof. In addition to shielding container 16, cover 45 serves to interconnect supports 30. Such interconnection is supplemented by side pipes 50 and 51 which extend horizontally and on opposite sides of the A-frames. The pipe 50 is connected to the legs 32 of the respective supports 30 while the pipe 51 is connected to the legs 31. At longitudinally spaced intervals, pipe 51 is provided with nozzles 52 which communicate with the inside of the pipe. Pipe 51 is in turn connected by means not shown to a source of water. The nozzles 52 are adapted to be directed downwardly and inwardly so that water may be supplied to the trough 18 as illustrated in FIGS. 2 and 5.

When the container 16 rotates, feed is discharged downwardly to the trough 18. To divide the feed and to deflect it laterally to opposite sides of the trough, a deflector 55 is provided which is of inverted U-shaped configuration. The deflector 55 is connected by brackets 56 to the crossbars 34 of the supports 30. A series of holes 58 is provided on each bracket so that the brackets 56 may be connected as desired to the crossbars 34 and the divider 55 can be laterally adjusted relative to the A-frame support members to thereby achieve a deflection of material as desired.

Dimensionally, the structure shown is particularly adapted for supplying feed to hogs. An animal is shown at H in FIG. 2, in position alongside trough 18 and feeding therefrom. The vertical adjustment provided by the slots 38 of the brackets 36 enables the structure to be adjusted to accommodate different sizes of animals. The lateral adjustment of the deflector 55 enables the distribution of feed so that more feed can be deposited along one longitudinal side of the trough 18 than the other if desired. The pipes 50 and 51 provide stability for the feeder structure and pipe 51, in addition, serves for the conveyance of water for the animals.

The overall structure contains a minimum number of parts, some of which serve dual functions. The arrangement is rugged and compact and highly suitable for the use intended.

While this invention has been described in connection with a particular embodiment thereof, it will be understood that it is capable of modification, and this application is intended to cover any variations, uses, or adaptations following, in general, the principles of the invention and including such departures from the present disclosure as come within known or customary practice in the art to which the invention pertains, and as fall within the scope of the invention or the limits of the appended claims.

Having thus described our invention, what we claim is:

1. Apparatus for feeding stock animals comprising an elongated ground supported rectilinear feeding station, an elongated generally horizontal container located above and coextensive with said feeding station, a feed supply hopper communicating with said container to supply feed thereto, conveying means operative in said container to receive feed from said hopper and distribute the feed along the length of the container, said container having a longitudinal slot which extends along a major portion of the length of the container, a plurality of relatively spaced supports for said container, each of said supports being generally in the form of an A-frame extending in a vertical plane transverse to the container and comprising a pair of inclined ground supported legs spaced at their lower ends and converging upwardly to a crossbar which connects the legs intermediate their ends and then to a top section which connects the legs at their upper ends, said container being located between the legs and over the crossbars of the supports, means on the crossbars supporting said container for rotatable movement whereby the container slot may be moved from an upper fill position to a lower dump position, a cover for said container extending the length of the container, means connecting said cover to said spaced supports, the cover extending across the top section of each A-frame and having depending side portions extending along the A-frame legs, said cover being vertically spaced from said container and in register with said slot whereby the slot is protected from the weather from above.

2. Apparatus for feeding stock animals as recited in claim 1 wherein feed divider means is carried on said crossbars beneath said container and having downwardly and outwardly inclined surfaces to deflect feed dumped from said container and through said slot, and means for connecting the divider means to the crossbars whereby the divider means may be adjusted laterally and the deflection of feed may be varied.

3. Apparatus for feeding stock animals as recited in claim 1 wherein said supports are connected to each other by longitudinally extending horizontal rails, said rails forming a water conduit and having nozzle means for directing water to said feeding station.

References Cited in the file of this patent

UNITED STATES PATENTS

| | | |
|---|---|---|
| 2,867,314 | Hansen | Jan. 6, 1959 |
| 2,940,639 | Winter | June 14, 1960 |
| 3,037,611 | Majorowicz | June 5, 1962 |

FOREIGN PATENTS

| | | |
|---|---|---|
| 805,211 | Great Britain | Dec. 3, 1958 |